UNITED STATES PATENT OFFICE.

RAYMOND VIDAL, OF PARIS, FRANCE.

EMULSIFIABLE LIQUID OR SOLID SOLUTION AND METHOD OF MAKING IT.

1,229,681.   Specification of Letters Patent.   Patented June 12, 1917.

No Drawing.   Application filed July 3, 1912. Serial No. 707,548.

*To all whom it may concern:*

Be it known that I, RAYMOND VIDAL, a citizen of the French Republic, and a resident of Paris, France, have invented certain new and useful Improvements in Emulsifiable Liquid or Solid Solutions and Methods of Making Them, of which the following is a specification.

It is well-known that sulforicinates and alkaline soaps possess the property of dissolving certain organic liquids insoluble in water. According to my present invention, the dissolving power of said substances can be increased considerably by using an alkaline compound of castor oil (in concentrated solution), or with the addition of certain aromatic compounds, as specified hereinafter.

I proceed by treating a relatively large amount or quantity of a liquid organic compound (such as, say, oil of turpentine, or petroleum), with a relatively small quantity of a solution of an alkaline compound of castor oil, adding certain aromatic compounds, of which the following are suitable: phenols, cresols, naphthols.

A soap of castor oil may be prepared by treating 75 kilograms of castor oil with 10 kilograms of caustic soda and 100 liters of water, and this liquid soap, or soap solution, will dissolve two and a half times its volume, of the organic liquid compounds to which the invention is applicable, for instance petroleum, or oil of turpentine, mentioned above, or in general, any one of the following liquid organic compounds:

(1) Aliphatic hydrocarbons and their bromin or chlorin compounds, such as chloroform, ethyl chlorid, and light or heavy petroleums of the series $C_nH_{2n+2}$.

(2) Cyclic hydrocarbons, light or heavy petroleums of the series $C_nH_{2n}$, essential oils. ionone, terpinol, ethyl chlorids or ethyl bromids.

(3) Aromatic hydrocarbons, such as benzols, toluols, xylols, ethyl benzols, cymene, and some of their nitro compounds, such as nitrobenzol.

(4) Aldehydes, ethers, or oxids, whether aromatic, cyclic, aliphatic, or mixed.

(5) Pyridic and quinolic bases.

(6) Tars, empyreumatic oils, such as oil of cade, oil of birch, and Dippel's oil (bone oil).

The addition of the aromatic compounds (phenols, cresols, naphthols) may be made either to the organic compounds to be dissolved, or to the mixture of said organic compounds with the alkaline compound of castor oil. The addition of the aromatic compounds is necessary to insure the stability of the solution obtained and decrease its thickness or viscosity, and further, such addition enables me to vary within wider limits, the proportion of the compound to be dissolved, relatively to the solution of the alkaline castor oil compound, than if this latter compound is used without the addition of aromatic compounds. When the aromatic compounds are not added, the resulting solution is solid or very thick or viscous. By adding the aromatic compounds, the liquidity of the resulting solution is greatly increased.

Example I: 5 kilograms of naphthol are dissolved by heating with 100 kilograms of oil of turpentine (very dry) and then I add 50 kilograms of a solution of castor oil soap, which may be prepared as described above. The mixture is stirred, and the result is a transparent, thick or viscous liquid which becomes slightly colored when exposed to the air.

The naphthol may be omitted, in which case the resulting solution remains colorless, and in which case also the mixture of spirits of turpentine with a solution of castor oil soap should be prepared cold, a moderate degree of heat being applied after the mixture has been prepared.

The liquid solutions obtained according to my invention as described above yield very permanent milky emulsions when mixed with water, and a certain quantity of alcohol may be added, without disturbing the character of the emulsion, to produce dilute alcoholic solutions.

Various modifications may be made, and equivalents employed, without departing from the nature of my invention as defined in the appended claims.

I claim:

1. A clear solution, emulsifiable with water, containing an aqueous solution of an alkaline compound of castor oil, a hydroxylated aromatic compound and at least an equal amount of an organic liquid insoluble in water.

2. The herein described process of making clear solutions emulsifiable with water, which consists in treating an organic compound insoluble in water with a solution of an alkaline compound of castor oil in the presence of a hydroxylated aromatic compound, the quantity of said organic compound being at least equal to that of the alkaline compound of castor oil.

3. The herein described process of making clear solutions emulsifiable with water, which consists in mixing and heating together, a solution of an alkaline compound of castor oil, the organic compound insoluble in water which is to be dissolved, and a hydroxylated aromatic compound.

RAYMOND VIDAL.

In presence of—
  H. C. COXE,
  JEAN GIG.